United States Patent [19]

Okamuro

[11] 4,444,065
[45] Apr. 24, 1984

[54] BELT TENSION GAUGE

[75] Inventor: James A. Okamuro, Kalamazoo, Mich.

[73] Assignee: Borroughs Tool & Equipment Corporation, Kalamazoo, Mich.

[21] Appl. No.: 423,419

[22] Filed: Sep. 24, 1982

Related U.S. Application Data

[63] Continuation of Ser. No. 240,711, Mar. 5, 1981, abandoned.

[51] Int. Cl.³ .............................................. G01L 5/06
[52] U.S. Cl. ............................................... 73/862.47
[58] Field of Search ............ 73/862.45, 862.47, 862.48

[56] References Cited

U.S. PATENT DOCUMENTS

| | | | |
|---|---|---|---|
| 2,996,914 | 8/1961 | Delehanty | 73/862.47 |
| 4,065,963 | 1/1978 | Saxl | 73/862.47 |
| 4,186,598 | 2/1980 | Okamuro | 73/862.47 |

FOREIGN PATENT DOCUMENTS

| | | | |
|---|---|---|---|
| 2305722 | 10/1976 | France | 73/862.47 |
| 2389880 | 10/1979 | France | 73/862.47 |

*Primary Examiner*—Charles A. Ruehl
*Attorney, Agent, or Firm*—Flynn, Thiel, Boutell & Tanis

[57] ABSTRACT

A tension gauge for accurately and visually indicating the tension on an elongated element, such as an automobile fan belt, includes a frame, a spring-loaded actuating member supported for reciprocal movement on the frame, and an extender which is secured to and extends away from the frame and has a pair of spaced surfaces thereon at a location remote from the frame which engages one side of the element. A third surface located intermediate the pair of surfaces engages the same side of the element, is connected to the actuating member by a linkage mechanism and is reciprocally movable in a direction transverse of the element in response to reciprocal movement of the actuating member. A spring-loaded fourth surface engages the opposite side of the element and urges the element firmly against the third surface. An indicator on the frame provides a visual display of the position of the third surface relative to the pair of surfaces, such position being proportional to the tension on the element.

10 Claims, 9 Drawing Figures

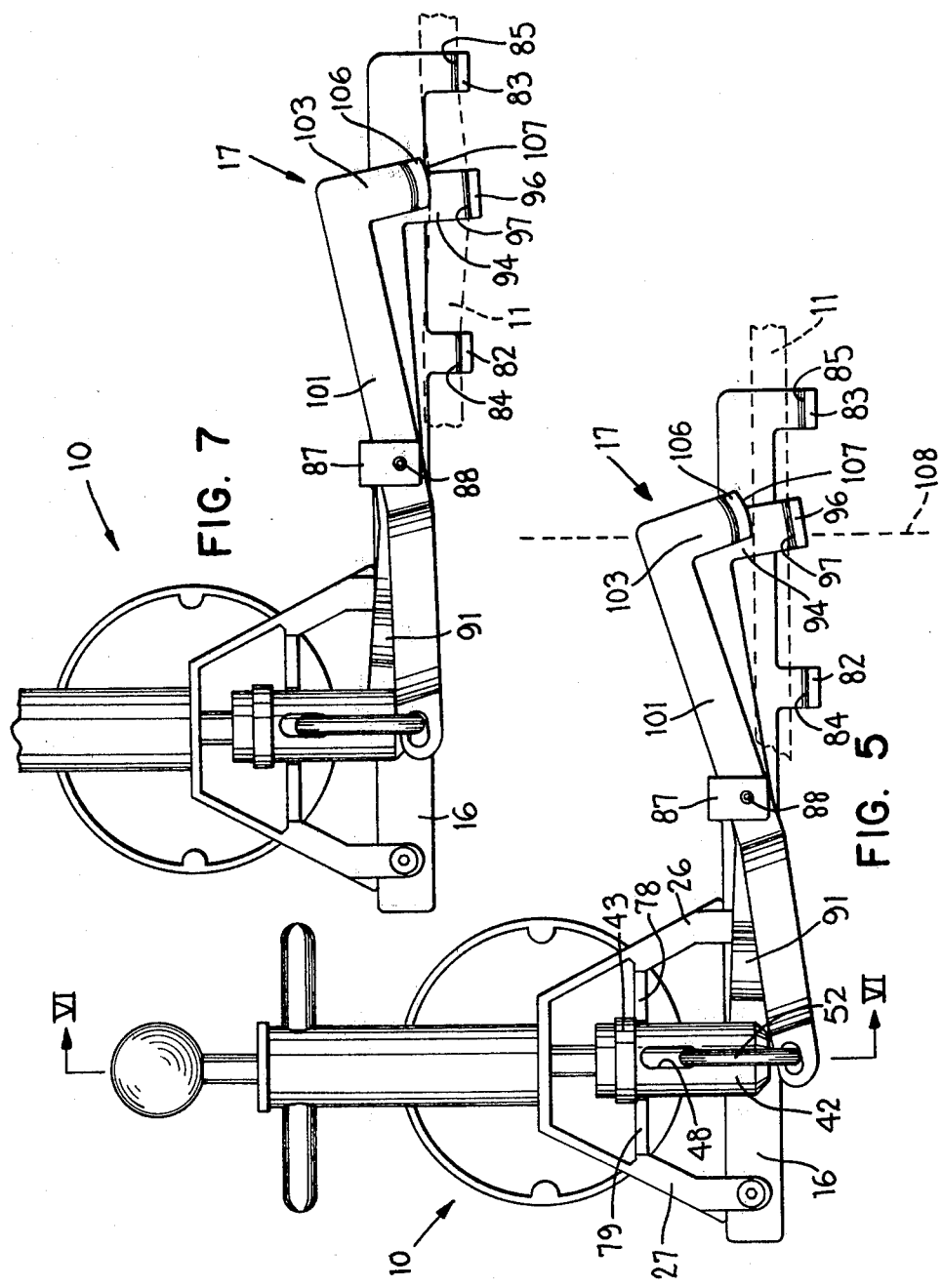

BELT TENSION GAUGE

CROSS-REFERENCE TO RELATED APPLICATION

This is a continuation of prior U.S. application Ser. No. 240,711, filed Mar. 5, 1981, now abandoned.

FIELD OF THE INVENTION

This invention relates to a tension gauge and, more particularly, to a tension gauge for accurately measuring and visually indicating the tension on an elongate element such as an automobile fan belt.

BACKGROUND OF THE INVENTION

The need for a gauge for testing the tension on an elongated flexible element, such as the reach of a belt, is well known, particularly in the automobile industry. Many gauges have been developed to meet the foregoing need, including those disclosed in U.S. Pat. Nos. 2,996,914 and 4,186,598, both of which are assigned to the same assignee as the present invention.

Although these prior gauges have worked well with the vehicle engines existing at the time of their development, they have not proved entirely satisfactory for many of the more recent engine designs. In particular, the recent emphasis on fuel economy has led to the design of a number of new automobiles which are smaller in size than their predecessors and have smaller engines. The smaller engines are frequently mounted in a small engine compartment in such a manner that the fan belt is only partially exposed and is not readily accessible. Further, many manufacturers are now utilizing a type of belt for these smaller engines which is commonly known as a "Poly-V" belt, and an accurate adjustment of belt tension is even more critical for a Poly-V belt than for traditional belts.

The prior art gauges have proved unsatisfactory for use with the new smaller engines primarily because their size and shape frequently precludes insertion of the gauge into the limited space available in the region of the fan belt. Even in cases where such gauges can be used, it is frequently awkward to guide the gauge into the proper position and connect it to the belt, and in some cases the indicator which displays the tension on the element is not readily visible to the operator of the gauge once the gauge is attached to the belt.

Accordingly, it is an object of the present invention to provide a tension gauge for measuring and indicating the tension on an elongated flexible element, such as the fan belt of an automotive vehicle, particularly in applications where access to the element is limited.

It is a further object of this invention to provide a tension gauge, as aforesaid, which is sufficiently sturdy in structure to withstand rugged treatment and requires little or no maintenance.

It is a further object of the invention to provide a tension gauge, as aforesaid, which is easily operated with one hand and directly gives accurate readings of the tension on the element in pounds of force.

It is a further object of this invention to provide a tension gauge, as aforesaid, which is arranged to compensate automatically for variations in the thickness of the element being tested.

SUMMARY OF THE INVENTION

The objects and purposes of the invention, including those set forth above, are met by providing a gauge for measuring the tension of an elongated flexible element, such as a fan belt, which comprises a frame having an actuating member supported thereon for reciprocal movement, an extender mounted to and extending away from the frame, an element engaging mechanism provided on the extender at a location spaced from the frame, a linkage mechanism connecting the actuating member to the element engaging mechanism, and an indicator mechanism provided on the frame and responsive to the element engaging mechanism for indicating the tension in the element. The element engaging mechanism includes first, second and third element engaging surfaces which are spaced from each other and face in substantially the same direction, the third element engaging surface being located between the first and second surfaces and being supported for reciprocal movement substantially along a line perpendicular to a plane containing the first and second surfaces between a retracted position and an advanced position in which the third surface is substantially coplanar with the first and second surfaces. The element engaging mechanism also includes a fourth element engaging surface which holds the elongate element firmly against the third element engaging surface. The linkage mechanism includes a linking bar which is pivotally mounted on the extender at a location intermediate the element engaging mechanism and the frame and is cooperable at one end with the actuating member and at the othr end with the third element engaging surface for effecting the reciprocal movement of the third element engaging surface in response to reciprocal movement of the actuating member.

BRIEF DESCRIPTION OF THE DRAWINGS

A more complete understanding of the objects, purposes and advantages of the invention will be apparent to persons acquainted with apparatus of this general type upon reading the following specification and inspecting the accompanying drawings, in which:

FIG. 5 is a rear view of the tension gauge of FIG. 1 in another position of operation;

FIG. 6 is a sectional view taken along the line VI—VI of FIG. 5;

FIG. 7 is a rear view of the tension gauge of FIG. 1 in still another position of operation;

Figure 1:
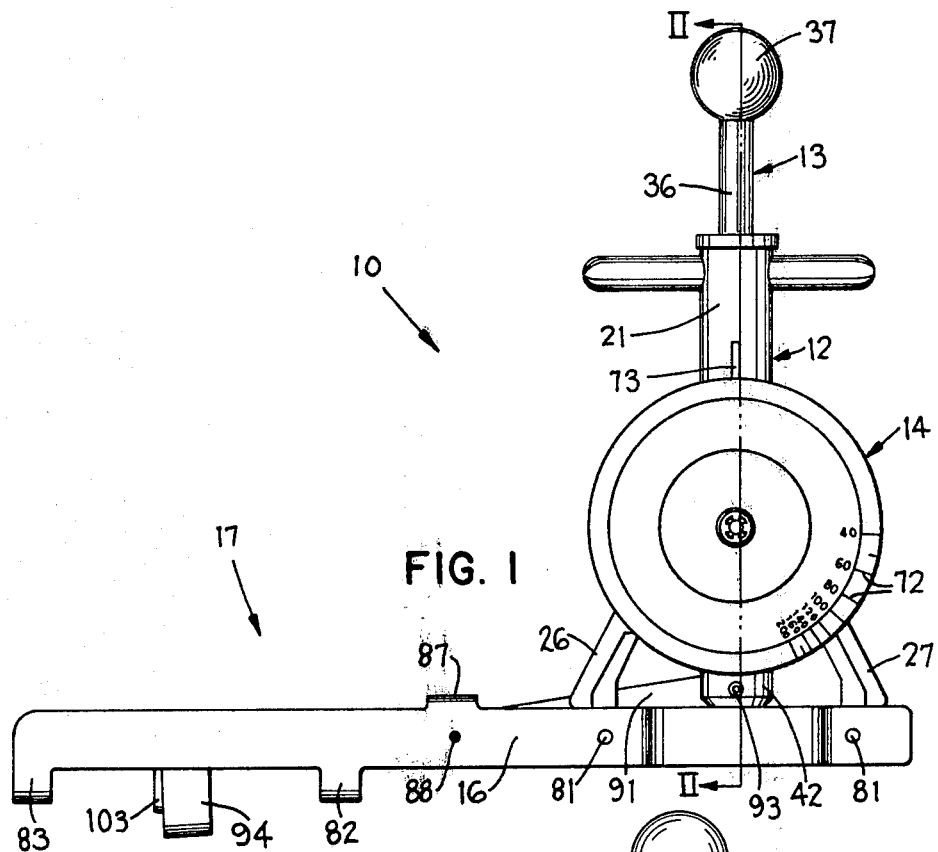
FIG. 1 is a front elevational view of a tension gauge embodying the invention.

Certain terminology will be used in the following description for convenience in reference only and will not be limiting. The words "up", "down", "front" and "rear" will have reference to the tension gauge as appearing in the drawings and according to the above descriptions. The words "in" and "out" will refer to directions toward and away from, respectively, the geometric center of the tension gauge and designated parts thereof. Such terminology will include the words specifically mentioned, derivatives thereof and words of similar import.

DETAILED DESCRIPTION

Referring to FIG. 1, a tension gauge 10 for measuring the tension in an elongate element 11 (FIGS. 5 and 7), such as an automobile fan belt, comprises a frame 12, a manually operated actuating mechanism 13 supported for reciprocal vertical movement on the frame 12, a tension indicator 14 supported on the frame 12, an extender bar 16 supported on the frame 12, and an element engaging mechanism 17 which is provided on the extender bar 16 at a location spaced from the frame 12.

More specifically, the frame 12 comprises a hollow cylindrical member 21 (FIG. 2) which has a vertical axis and is closed at the lower end by a wall 22 having an opening 23 therethrough coaxial with the cylindrical member 21. As shown in FIG. 3, the frame 12 also comprises a U-shaped member 24 which is fixed to the cylindrical member 21 and has a pair of spaced legs 26 and 27 which extend generally downwardly on opposite sides of the axis of the cylindrical member 21. A pair of radially outwardly extending handle posts 28 and 29 are provided on diametrically opposite sides of the cylindrical member 21 near the top thereof. A plastic washer 31 (FIG. 2) having a coaxial opening 32 therethrough is snugly received within the cylindrical member 21 at the top thereof and is maintained within the cylindrical member 21 by an inwardly extending annular upset 33 provided on a cap covering the top of the cylindrical member 21. The upset 33 also defines the perimeter of an opening through the cap.

The plunger 13 includes a rod 36 (FIG. 2) which coaxially extends through the cap, is received within the hollow cylindrical member 21, extends through the openings 32 and 23 respectively provided in the washer 31 and end wall 22, and serves an an actuating member. A spherical knob 37 is mounted on the upper end of the rod 36 in a conventional and appropriate manner, as by threaded engagement. A spiral compression spring 38 encircles the rod 36 within the cylindrical member 21 and is held under compression between the end wall 22 of the cylindrical member 21 and a washer 39 which encircles the rod 36 within the cylindrical member 21 and is held against upward movement with respect to the rod 36 by a pin 41 (FIGS. 2 and 3) which extends through the rod 36.

An actuating member 42 is a generally cylindrical end cap for the rod 36 having a radially outwardly extending annular flange 43 at the upper edge thereof and having a coaxial bore 44 of slightly larger diameter than the rod 36 in one end thereof which defines an annular side wall 46 and an end wall 47. The lower end of the rod 36 is slidably received within the bore 44 of the end cap 42. A longitudinally extending slot 48 is provided in the side wall 46 of the end cap 42 and an opening 49 which is radially aligned with the slot 48 is provided in the rod 36. One arm 51 of a U-shaped clamp actuator 52 is securely and rigidly mounted in the opening 49 in the rod 36 and extends radially outwardly through the slot 48 in the side wall 46 of the end cap 42. The U-shaped clamp actuator 52 has a bight 53 which is spaced radially outwardly from the end cap 42 and extends downwardly parallel to the axis of the end cap 42, and has a lower arm 54 which is shorter than the arm 51 and extends radially inwardly parallel to the arm 51 to a point slightly spaced from the end cap 42.

A spiral compression spring 56 is disposed within the bore 44 in the end cap 42 and is held under compression between the lower end of the rod 36 and the end wall 47 of the end cap 42, thereby urging the end cap 42 and the rod 36 in opposite axial directions relative to each other. Such relative axial movement between the rod 46 and the end cap 42 is limited to the range of movement between the positions in which the arm 51 of the clamp actuator 52 is respectively engaging the upper and the lower ends of the slot 48 in the side wall 46 of the end cap 42.

A rubber washer 57 encircles the rod 36 between the top of the end cap 42 and the lower end wall 22 of the cylindrical member 21.

Figure 2:
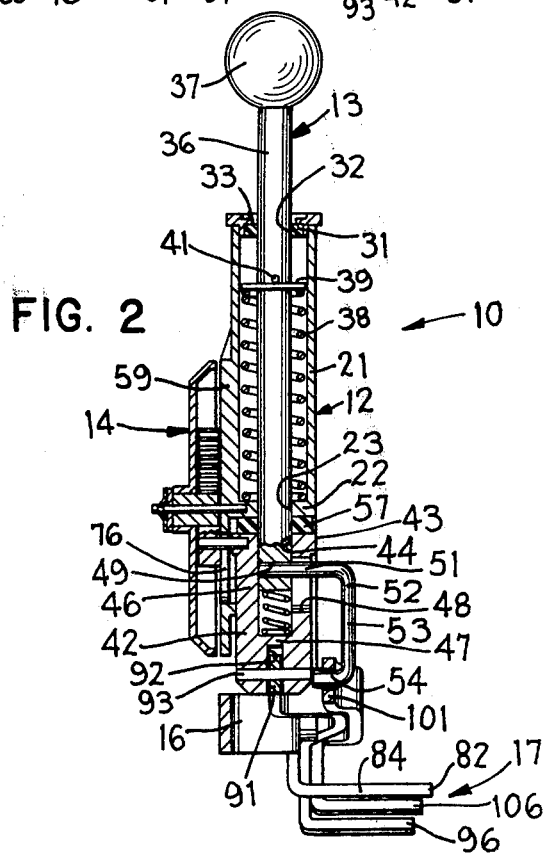
FIG. 2 is a sectional view taken along the line II—II of FIG. 1.
Figure 3:
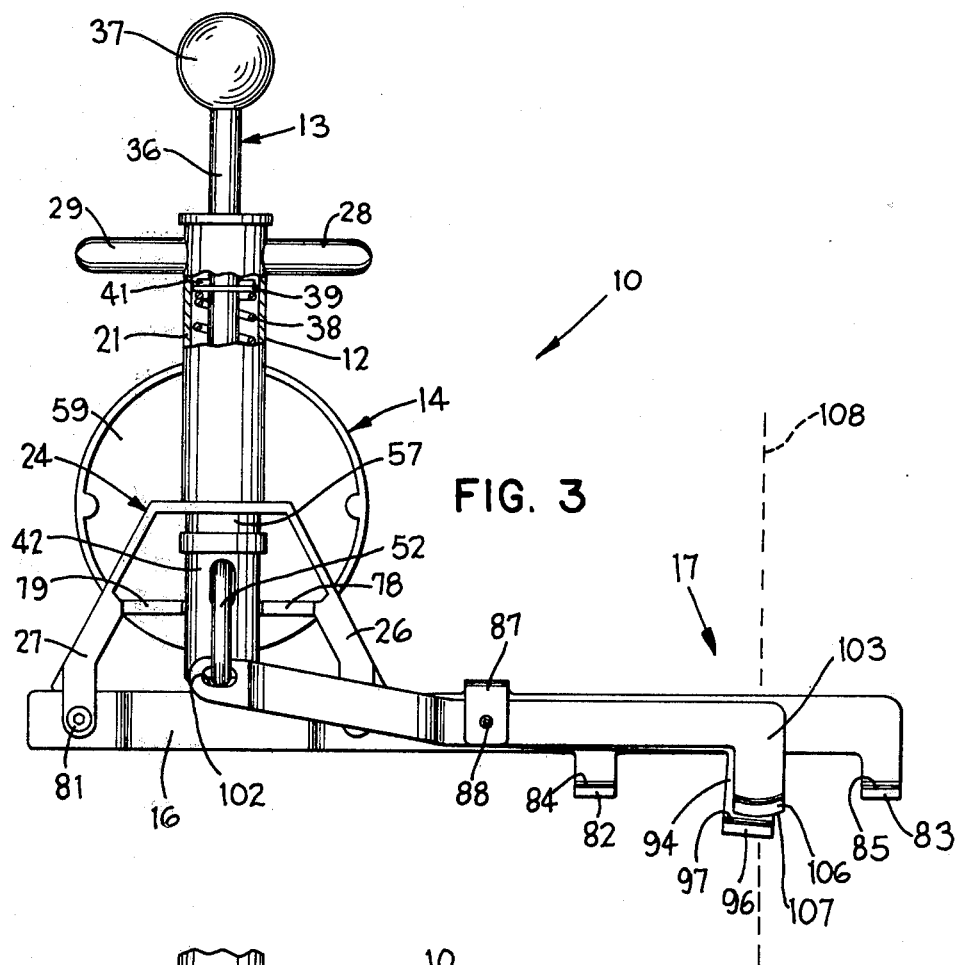
FIG. 3 is a rear elevational view, partially in section, of the tension gauge of FIG. 1.

As shown in FIGS. 2 and 3, a circular mounting plate 59 which extends parallel to the axis of the cylindrical member 21 is mounted on the front of the cylindrical member 21. As shown in FIG. 6, a horizontal pivot pin 61 is securely mounted in an opening 62 provided in the center of the circular mounting plate 59. A circular dial plate 63 (FIGS. 1 and 6) has a central hub 64 through which the pivot pin 61 coaxially extends. A gear 66 is rotatably sleeved upon the pivot pin 61 and is snugly force-fit into the hub 64 of the dial plate 63. The gear 66 is disposed adjacent the mounting plate 59 and is maintained in this position on the pivot pin 61 by washers 67 and a metal clip 68 engaging the outer end of the pivot pin 61. A substantially vertical gear rack 69 is supported for reciprocal vertical movement on the surface of the mounting plate 59 in toothed engagement with the gear 66. The peripheral edge 71 of the dial plate 63 is sloped toward the mounting plate 59 in order to substantially enclose the rack 69 and the gear 66 which are disposed between the dial plate 63 and the mounting plate 59. Calibrated markings 72 (FIG. 1) are provided about the periphery of the dial plate 63 and are alignable with an indicator 73 which is provided on the surface of the cylindrical member 21 to give a direct reading of the amount of tension on the element 11 which is engaged by the tension gauge 10.

As shown in FIGS. 2 and 6, a vertically extending slot 76 is provided in the mounting plate 59 along the path of movement of the lower end of the rack 69, and a post 77 extends through the slot 76 and is securely affixed to the lower end of the rack 69 and to the upper end of the end cap 42 in order to effect reciprocal verticl movement of the rack 69 in response to reciprocal vertical movement of the end cap 42, which movement of the rack 69 effects rotation of the gear 66 and the dial plate 63.

As shown in FIG. 3, a pair of limit stops 78 and 79 is respectively provided on the legs 26 and 27 of the frame 12 and extends radially inwardly toward the axis of the cylindrical member 21 to points spaced slightly from the side wall 46 of the end cap 42.

The plunger 13 is in an initial position, illustrated in FIGS. 2 and 3, with respect to the cylindrical member 21 when the rubber washer 57 is firmly clamped between the top of the end cap 42 and the lower wall 22 of the cylindrical member 21, thereby inhibiting and cushioning further upward movement of the rod 36 in response to the urging of the spring 38. In this initial position, the arm 51 of the clamp actuator 52 is disposed against the upper end of the slot 48 in the end cap 42.

Figure 4:
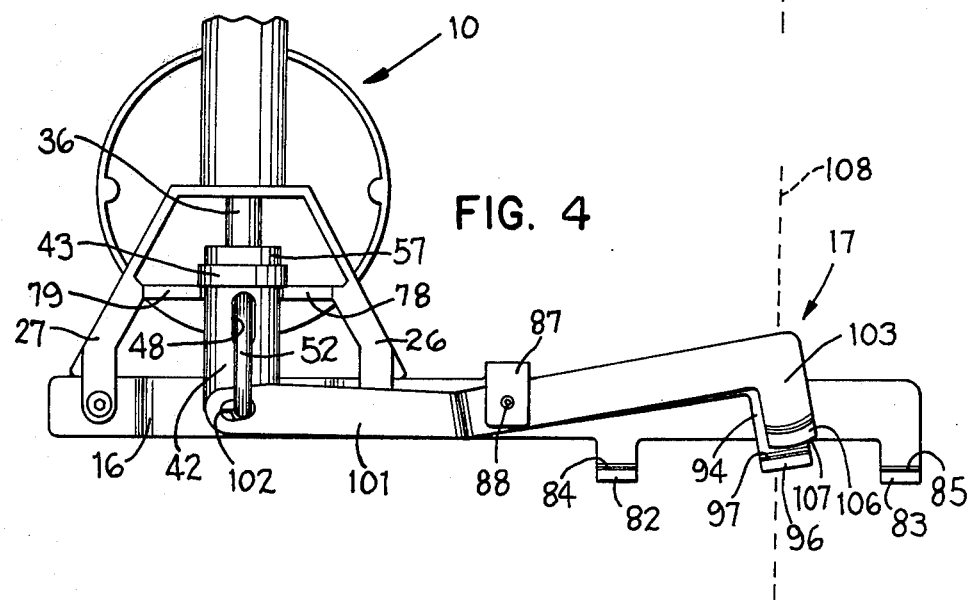
FIG. 4 is a partial rear view of the tension gauge of FIG. 1 in a different position of operation.

FIG. 4 illustrates an intermediate position of the plunger 13 in which the rod 36 and cap 42 have moved downwardly together against the urging of the spring 38 until the bottom edge of the annular flange 43 on the end cap 42 is engaging the limit stops 78 and 79 on the legs 26 and 27, respectively, of the frame 12. The spring 56 is stronger than the spring 38 and therefore only the spring 38 is compressed. No relative movement occurs between the rod 36 and cap 42 and therefore the arm 51 of the clamp actuator 52 is still disposed against the upper end of the slot 48 in the end cap 42.

FIGS. 5 and 6 illustrate a terminal position of the plunger 13 in which the rod 36 has moved downwardly past the intermediate position illustrated in FIG. 4. Since downward movement of the end cap 42 beyond the intermediate position illustrated in FIG. 4 is prevented by the engagement of the annular flange 43 with the limit stops 78 and 79, downward movment of the rod 36 to the terminal position illustrated in FIGS. 5 and 6 causes the spring 56 in the bore 44 of the end cap 42 to be compressed and the arm 51 of the clamping actuator 52 to move downwardly to the lower end of the sot 48 in the side wall 46 of the end cap 42.

The extender bar 16 is rigidly mounted to the lower ends of the legs 26 and 27 of the frame 12 in any convenient manner, such as by rivets 81 (FIGS. 1 and 3), and extends outwardly substantially perpendicular to the axis of the hollow cylindrical member 21. A pair of spaced tabs 82 and 83 is provided on the bottom of the extender bar 16 at locations remote from the frame 12 and bent rearwardly at substantially a right angle to the extender bar 16 so as to respectively define a pair of upwardly facing and coplanar element engaging surfaces 84 and 85. A tab 87 is provided on the top of the extender bar 16 at a location between the tabs 82 and 83 and the frame 12, and is bent substantially 180° so as to extend downwardly parallel to and slightly spaced from the extender bar 16. A pivot pin 88 is securely mounted in openings provided in the tab 87 and the bar 16 and extends across the space therebetween.

An elongate linking bar 91 extends substantially parallel to the extender bar 16 and is pivotally mounted near its midpoint on the pivot pin 88 between the tab 87 and the extender bar 16. A slot 92 (FIG. 2) is provided in the bottom surface of the end wall 47 of the end cap 42 and extends parallel to the linking bar 91. One end of the linking bar 91 is received within the slot 92 and is pivotally supported there by a pin 93 which extends transversely of the linking bar 91 through aligned openings in the end cap 42 and the linking bar 91. A tab 94 is provided at the opposite end of the linking bar 91 on the lower edge thereof and extends downwardly at substantially a right angle to the linking bar 91. The tab 94 is positioned intermediate the tabs 82 and 83 on the extender bar 16. The lower end 96 of the tab 94 is bent rearwardly at substantially a right angle to the remainder of the tab 94 so as to define a substantially horizontal, upwardly facing, element engaging surface 97.

A clamping bar 101 is pivotally mounted near its midpoint on the pivot pin 88 between the linking bar 91 and the tab 87 of the extender bar 17. An elongated opening 102 (FIGS. 2 and 4) is provided through the end of the clamping bar 101 adjacent the end cap 42 and the lower arm 54 of the clamp actuator 52 extends through the opening 102. A tab 103 is provided at the opposite end of the clamping bar 101 on the lower edge thereof and extends downwardly at substantially a right angle to the clamping bar 101. The lower end 106 of the tab 103 is bent rearwardly at substantially a right angle to the rest of the tab 103 so as to define a substantially horizontal and downwardly facing element engaging surface 107.

The element engaging mechanism 17 includes the element engaging surfaces 84 and 85 on the extender bar 16, the element engaging surface 97 on the linking bar 91, and the element engaging surface 107 on the clamping bar 101.

In the initial position of operation illustrated in FIGS. 2 and 3, the element engaging surface 97 on the end of the linking bar 91 is spaced vertically below the plane of the element engaging surfaces 85 and 86 on the extender bar 16 and the element engaging surface 107 on the end of the clamping bar 101 is positioned adjacent the element engaging surface 97 on the linking bar 91. When the plunger 13 is moved from the initial position of operation to the intermediate position illustrated in FIG. 4, the simultaneous downward movement of the end cap 42 and the clamp actuator 52 respectively cause the linking bar 91 and the clamping bar 101 to pivot simultaneously around the pivot pin 88, thereby causing the respective element engaging surfaces 97 and 107 to move vertically upwardly substantially along a line 108 parallel to the axis of the hollow cylindrical member 21 from a retracted position to an advanced position in which the element engaging surface 97 is approximately coplanar with the element engaging surfaces 82 and 83 on the extender bar 16 and the element engaging surface 107 is still in a position adjacent the element engaging surface 107. When the plunger 13 is thereafter moved to the terminal position illustrated in FIG. 5, the clamp actuator 52 moves downwardly relative to the end cap 42 as described hereinabove, thereby pivoting the clamping bar 101 about the pivot pin 88 relative to the linking bar 91 and causing the element engaging surface 107 on the clamping bar 101 to move substantially vertically along the line 108 to a position spaced from the element engaging surface 97 on the linking bar 91.

Figure 9:
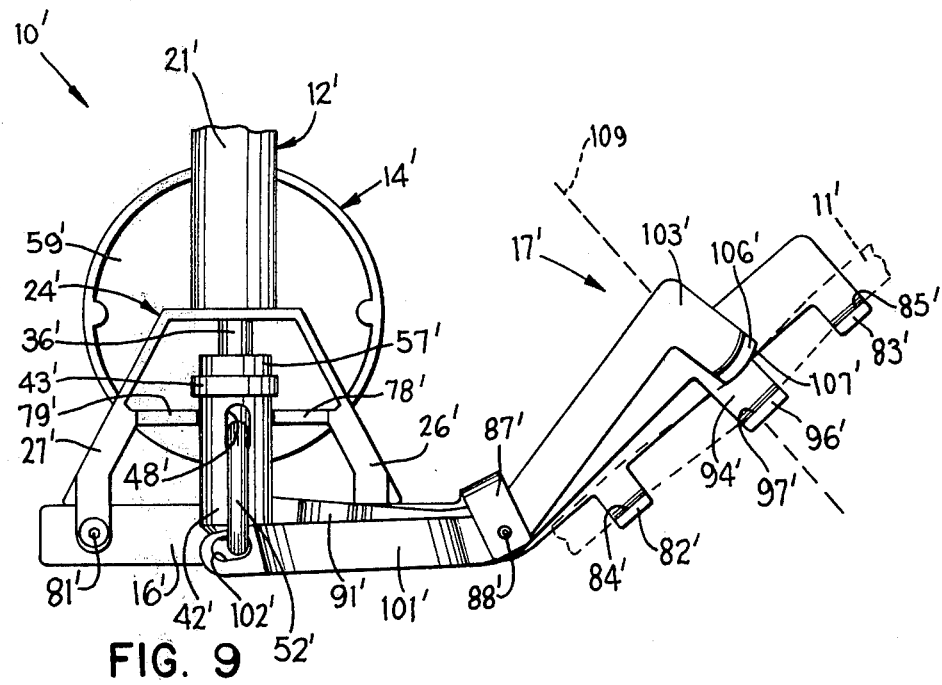
FIG. 9 is a rear view of an alternative embodiment of the tension gauge of FIG. 1.
Figure 8:
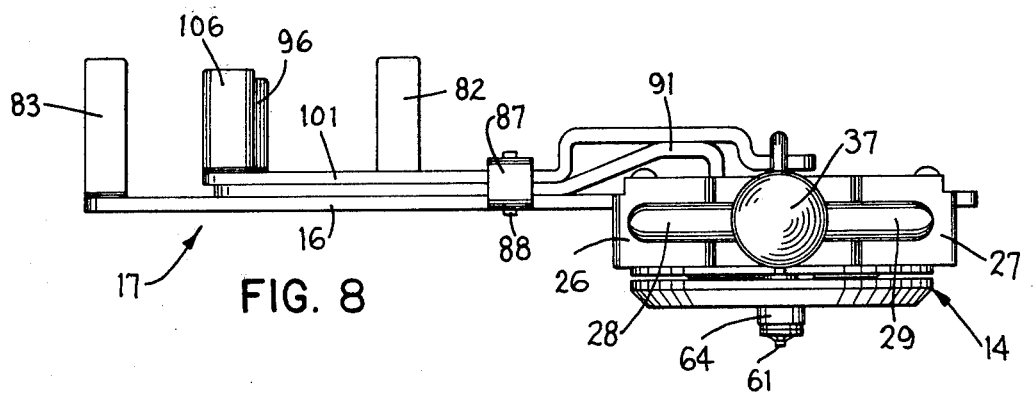
FIG. 8 is a top view of the tension gauge of FIG. 1.

FIG. 9 illustrates an alternative embodiment of a tension gauge 10' embodying the present invention. The tension gauge 10' is structurally identical to the tension gauge 10 of FIGS. 1-8 except as specifically set forth hereinafter, and identical or equivalent parts are therefore designated by the reference numerals used hereinabove with a prime (') added.

The embodiment of FIG. 9 differs from the embodiment of FIGS. 1-8 only in that the extender bar 16', the linking bar 91' and the clamping bar 101' are each bent in the region adjacent the pivot pin 88' so that they extend substantially perpendicular to the axis of the cylindrical member 21' between the frame 12 and the pivot pin 88' and extend at a slight upward incline with respect to the axis of the cylindrical member 21' on the opposite side of the pivot pin 88. Accordingly, the movement of the element engaging surfaces 97' and 107', which are respectively provided on the linking bar 91' and clamping bar 101', occurs along a line 109 which, unlike the line 108 in FIGS. 3 and 4, extends at an angle with respect to the axis of the cylindrical member 21'. This modified orientation of the gripping mechanism 17' with respect to the frame 12' and plunger 13' facilitates engagement of the gripping mechanism 17' with the elongate element 11' in certain applications. It will be recognized that the angle of the bends in the extender bar 16', the linking bar 91' and the clamping bar 101' could be greater or less than that illustrated in FIG. 9.

OPERATION

Although the operation of the tension gauges 10 and 10' will be obvious from the foregoing description to one skilled in the art, a brief description of such operation is provided hereinafter to ensure a complete understanding of the invention.

In general, the tension gauge 10 (FIG. 1) is operated by manually grasping it so that the knob 37 is cupped in the palm of the hand and the handle posts 28 and 29 are each engaged by two fingers of the hand. By manually squeezing the knob 37 toward the posts 28 and 29, the plunger 13 is moved from the initial position of FIG. 3 to the intermediate position of FIG. 4, causing the linking bar 91 and a clamping bar 101 to pivot around the pivot pin 88, thereby moving the element engaging surface 97 upwardly substantially along the line 108 to a position approximately coplanar with the element engaging surfaces 84 and 85 on the extender bar 16 and moving the element engaging surface 107 on the clamping bar 101 upwardly along the line 108 so that it remains adjacent the element engaging surface 97. Simultaneously, the movement of the end cap 42 from the initial position to the intermediate position acts through the post 77 (FIG. 6) to move the gear rack 69 vertically downwardly, thereby rotating the gear 66 and the circular dial plate 63.

Downward movement of the end cap 42 beyond the intermediate position illustrated in FIG. 4 is prevented by the engagement of the annular flange 43 thereon with the limit stops 78 and 79, and so further manual squeezing of the knob 37 toward the handle posts 28 and 29 will cause the rod 36 to slide downwardly within the end cap 42 against the compression of the spring 56 to the terminal position illustrated in FIGS. 5 and 6 in which the arm 51 of the clamp actuator 52 is bottomed in the sot 48 of the end cap 42. As the plunger 13 moves from the intermediate to the terminal position, the movement of the clamp actuator 52 relative to the end cap 42 causes the clamping bar 101 to pivot relative to the linking bar 91 about the pivot pin 88, such that the element engaging surface 107 on the clamping bar 101 moves vertically upwardly substantially along the line 108 to a position spaced from the element engaging surface 97 on the linking bar 91.

With the plunger 13 maintained in the terminal position by the manual forces applied to the knob 37 and the handle posts 28 and 29, the tension gauge 10 is moved rearwardly until the elongate element 11 is disposed between the element engaging surfaces 97 and 107 and above the element engaging surfaces 84 and 85. The manual pressure applied to the knob 37 and the handle posts 28 and 29 is then slowly released, such that the rod 36 and the clamp actuator 52 move upwardly relative to the end cap 42 due to the urging of the spring 56 and cause a scissorlike movement of the clamping bar 101 and linking bar 91 around the pivot pin 88 which moves the element engaging surface 107 on the clamping bar 101 downwardly toward the element engaging surface 97 on the linking bar 91 until the elongate element 11 is firmly clamped between the element engaging surfaces 97 and 107 by the force of the spring 56. Typically, the arm 51 of the clamp actuator 52 will be intermediate the ends of the slot 48 in the end cap 42 when the element 11 is thus clamped between the element engaging surfaces 97 and 107.

Further release of the manual pressure applied to the knob 37 and the handle posts 28 and 29 will cause the end cap 42 to move upwardly away from the intermediate position under the urging of the spring 38, thereby causing the element engaging surfaces 97 and 107 on the ends of the linking bar 91 and clamping bar 101 to move downwardly, still firmly gripping the element 11, until the element 11 is disposed against the element engaging surfaces 84 and 85 and the tension in the element 11 is balanced against the urging of the spring 18 (FIG. 6), which position of equilibrium is illustrated in FIG. 7. The spring 56 in the bore 44 of the end cap 42 is sufficiently strong to keep the element engaging surface 107 on the clamping bar 101 firmly pressing the elongate element 11 against the element engaging surface 97 of the linking bar 91 so long as the tension on the element 11 is within the range of tension that the tension gauge 10 is designed to measure.

As the end cap 42 moves upwardly from the intermediate position of FIG. 5 to the position of equilibrium of FIG. 7, the post 77 (FIG. 6) connecting the end cap 42 to the gear rack 69 moves the gear rack 69 upwardly and the toothed engagement of the rack 69 and the gear 66 causes the dial plate 63 to rotate. The calibrated markings 72 (FIG. 1) are so positioned along the peripheral edge of the dial plate 63 that, in the position of equilibrium illustrated in FIG. 7, the calibration mark 72 nearest the indicator 73 on the cylindrical member 21 will indicate the tension in the elongate element 11 and can be read directly by the operator of the gauge. Increasing the tension in the element 11 reduces the extent to which the element engaging surface 97 can be moved downwardly away from the plane of the element engaging surfaces 84 and 85 and the dial plate 63 is responsive to his distance through the linking bar 91, the end cap 42, the gear rack 69 and the gear 66 to indicate the tension in the element 11. Since the critical factor is the extent to which the element engaging surface 97 has moved out of the plane of the element engaging surfaces 84 and 85 and since the element engaging surfaces 84, 85 and 97 are all disposed against the same side of the elongate element 11, the accuracy of the readings obtained from the tension gauge 10 is not affected by variations in the thickness of the elongate element 11.

After the operator has read the tension in the element 11 from the calibrated markings 72 on the dial plate 63, the tension gauge 10 can be disengaged from the element 11 by grasping the tension gauge 10 in the manner described hereinabove and again manually pressing the knob 37 toward the handle posts 28 and 29 until the plunger 13 moves into the terminal position illustrated in FIG. 5. The tension gauge 10 can then be moved forwardly away from the elongate element 11. The manual pressure applied to the knob 37 can then be released entirely and the plunger 13 will return under the urging of the springs 38 and 56 to the initial position illustrated in FIGS. 2 and 3. The rubber washer 57 acts as a cushion as the movement of the end cap 42 is halted, thereby preventing damage to the rack 69 and gear 66.

The operation of the alternative embodiment illustrated in FIG. 9 is identical in all respects to that described hereinabove with respect to the embodiment of FIGS. 1-8 and additional explanation is therefore unnecessary.

Although two preferred embodiments of the invention have been described in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A gauge for measuring the tension on an elongated flexible element, comprising:

a frame;

an actuating member supported on said frame for reciprocal movement between first and second positions;

an extender mounted to and extending away from said frame;

an element engaging mechanism provided on said extender at a location spaced from said frame and said actuating member, including:

first and second element engaging surfaces spaced from each other and facing in substantially the same direction;

a third element engaging surface facing in said direction and supported for reciprocal movement substantially in said direction between a retracted position and an advanced position, said third element engaging surface being intermediate and substantially coplanar with said first and second element engaging surfaces in said advanced position; and a fourth element engaging surface for engaging a side of the elongate element opposite said third element engaging surface;

first resilient means for continually urging said fourth element engaging surface into said engaging relation with the elongate element and thereby continually urging the elongate element against said third element engaging surface;

linkage means cooperable with said element engaging mechanism and said actuating member for effecting said movement of said third element engaging surface between said retracted and advanced positions in response to movement of said actuating member between said first and second positions, respectively;

second resilient means for urging said third element engaging surface toward said retracted position; and indicator means responsive to said movement of said third element engaging surface for indicating the distance between said third element engaging surface and said advanced position, such distance being proportional to the tension in the element.

2. The tension gauge of claim 1, wherein said linkage means includes a linking element supported on said extender at a location between said frame and said element engaging mechanism for pivotal movement about a pivot axis which extends transversely of said linking element, said linking element having one end connected to said actuating member and said third element engaging surface being provided on said linking element at the end thereof remote from said one end.

3. The tension gauge of claim 2, including a clamping element supported on said extender for pivotal movement about said pivot axis independently of said pivotal movement of said linking element, wherein said fourth element engaging surface is provided on one end of said clamping element, faces said third element engaging surface, is movable under the urging of said first resilient means with said third element engaging surface from said retracted to said advanced position, and is movable relative to said third element engaging surface substantially in said direction in response to pivotal movement of said clamping element relative to said linking element between positions spaced from and adjacent to said third element engaging surface.

4. The tension gauge of claim 3, including a second actuating member supported for reciprocal movement on said frame, said second actuating member being movable simultaneously with said first-mentioned actuating member from said first position to said second position and being movable relative to said first-mentioned actuating member between said second position and a third position;

wherein said one end of said linking element is pivotally connected to said first-mentioned actuating member and the end of said clamping element remote from said one end is pivotally connected to said second actuating member;

whereby said simultaneous movement of said first-mentioned and said second actuating members from said first to second positions causes a simultaneous pivotal movement of said linking element and said clamping element about said pivot axis to effect said movement of said third and fourth element engaging surface from said retracted to said advanced position, and whereby said movement of said second actuating member from said second to said third position causes said clamping element to pivot about said pivot axis relative to said linking element and effect said movement of said fourth element engaging surface from said adjacent position to said spaced position.

5. The tension gauge of claim 4, wherein:

said reciprocal movement of said first-mentioned and said second actuating members is along a line which is substantially perpendicular to the portion of said linking element which extends between said first-mentioned actuating member and said pivot axis;

said first resilient means engages said first-mentioned and said second actuating members and urges them in opposite directions along said line; and said second resilient means engages said frame and said second actuating member and urges said second actuating member along said line in the same direction that said second actuating member is urged by said first resilient means.

6. The tension gauge of claim 3, wherein:

said extender and said linking and clamping elements are elongated metal bars;

said first and second element engaging surfaces are each a tab on said extender bent to extend at a right angle thereto; and said third and fourth element engaging surfaces are each a tab respectively provided on said linking and clamping elements which is bent to extend at a right angle thereto.

7. The tension gauge of claim 3, wherein said extender and said linking and clamping elements each have a bend in the region of said pivot axis.

8. A gauge for measuring the tension on an elongated flexible element, comprising:

a frame;

an actuating member supported on said frame for reciprocal movement between first and second positions along a first line extending in a first direction;

an element engaging mechanism and means supporting said element engaging mechanism at a location spaced from said actuating member, said element engaging mechanism including:

first and second element engaging surfaces spaced from each other and facing substantially in a second direction;

a third element engaging surface facing in said second direction and supported for reciprocal movement substantially along a line extending in said second direction between a retracted position and an advanced position, said third element engaging surface being intermediate and substantially coplanar with said first and second element engaging surfaces in said advanced position; and a fourth element engaging surface for engaging a side of the elongate element opposite said third element engaging surface;

first resilient means for continually urging said fourth element engaging surface into said engaging relation with the elongate element and thereby continually urging the elongate element against said third element engaging surface;

linkage means cooperable with said element engaging mechanism and said actuating member for effecting said movement of said third element engaging surface between said retracted and advanced positions in response to movement of said actuating member between said first and second positions, respectively;

second resilient means for urging said third element engaging surface toward said retracted position; and indicator means responsive to said movement of said third element engaging surface for indicating the distance between said third element engaging surface and said advanced position, such distance being proportional to the tension in the element.

9. A gauge for measuring the tension on an elongated flexible element, comprising:

a frame;

an actuating member supported on said frame for reciprocal movement between first and second positions along a first line extending in a first direction;

first and second element engaging surfaces spaced from each other and facing substantially in said first direction, and means supporting said first and second element engaging surfaces so that the midpoint of a line connecting said first and second element engaging surfaces is spaced from said first line;

a third element engaging surface facing in said one direction and supported for reciprocal movement substantially along a second line which is parallel to said first line and contains said intermediate point between a retracted position and an advanced position, said third element engaging surface being intermediate and substantially coplanar with said first and second element engaging surfaces in said advanced position;

a fourth element engaging surface for engaging a side of the elongate element opposite said third element engaging surface;

first resilient means for continually urging said fourth element engaging surface into said engaging relation with the elongate element and thereby continually urging the elongate element against said third element engaging surface;

linkage means cooperable with said third element engaging surface and said actuating member for effecting said movement of said third element engaging surface between said retracted and advanced positions in response to movement of said actuating member between said first and second positions, respectively;

second resilient means for urging said third element engaging surface toward said retracted position; and indicator means responsive to said movement of said third element engaging surface for indicating the distance between said third element engaging surface and said advanced position, such distance being proportional to the tension in the element.

10. A gauge for measuring the tension on an elongate flexible element, comprising:

a frame;

an actuating member supported on said frame for reciprocal movement between first and second positions;

an extender supported on and extending away from said frame;

element engaging means provided on said extender at a location spaced from said frame and said actuating member and releasably engageable with the elongate element for applying a predetermined force to the elongate element in a manner effecting a deflection thereof;

linkage means for operatively coupling said element engaging means and said actuating member so as to facilitate engagement and disengagement of said element engaging means with the elongate element in response to movemment of said actuating member; and indicator means responsive to said element engaging means for indicating the degree of deflection of the elongate element, such deflection being proportional to the tension on the element;

wherein said element engaging means includes spaced first and second element engaging surfaces facing in substantially a first direction and engageable with one side of the elongate element, an element engaging device supported between said first and second element engaging surfaces for reciprocal movement relative thereto and engageable with the elongate element on a side thereof opposite said one side, and first resilient means cooperable with said element engaging device for yieldably urging said element engaging device in a second direction approximately opposite said first direction to effect said deflection of said elongate element; and wherein said element engaging device includes a third element engaging surface facing in said first direction and supported for reciprocal movement substantially in said first direction between a retracted position and an advanced position, said third element engaging surface being intermediate and substantially coplanar with said first and second element engaging surfaces in said advanced position, a fourth element engaging surface engageable with a side of the elongate element opposite said third element engaging surface and supported for reciprocal movement relative to said third element engaging surface in substantially said first direction, and second resilient means for urging said fourth element engaging surface into said engaging relation with the elongate element and thereby urging the elongate element against said third element engaging surface, said first resilient means urging said third element engaging surface toward said retracted position.

* * * * *